United States Patent
Su et al.

(10) Patent No.: US 12,153,815 B1
(45) Date of Patent: Nov. 26, 2024

(54) SEMICONDUCTOR MEMORY DEVICE AND DATA STORAGE METHOD THEREOF

(71) Applicant: MACRONIX INTERNATIONAL CO., LTD., Hsinchu (TW)

(72) Inventors: Wei-Cheng Su, New Taipei (TW); Chih-Hsiang Yang, New Taipei (TW); Hsiang-Lan Lung, Kaohsiung (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

(21) Appl. No.: 18/510,791

(22) Filed: Nov. 16, 2023

(51) Int. Cl.
*G06F 3/06* (2006.01)

(52) U.S. Cl.
CPC ............ *G06F 3/064* (2013.01); *G06F 3/0604* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,743,604 B2 | 6/2014 | Chae | |
| 10,157,126 B2 | 12/2018 | Wheeler | |
| 10,283,186 B2 | 5/2019 | Jeon et al. | |
| 2002/0143761 A1* | 10/2002 | Shimano | G06F 16/583 |
| | | | 707/999.005 |
| 2020/0089455 A1* | 3/2020 | Green | G10L 25/63 |
| 2023/0134852 A1* | 5/2023 | Lee | G06F 16/2455 |
| | | | 707/771 |

FOREIGN PATENT DOCUMENTS

| | | |
|---|---|---|
| TW | 201131573 A | 9/2011 |
| TW | 201633055 A | 9/2016 |
| TW | 201824001 A | 7/2018 |

* cited by examiner

*Primary Examiner* — Tracy C Chan
(74) *Attorney, Agent, or Firm* — McClure, Qualey & Rodack, LLP

(57) ABSTRACT

The application discloses a semiconductor memory device and a data storage method. When determining that an input data conforms to a target format, an input data vector is generated based on the input data. When determining that the input data is similar to a stored data in a target block of the memory array, the input data is written to a blank target memory page of the target block of the memory array.

20 Claims, 7 Drawing Sheets

| Vector | Block | Page |
|---|---|---|
| [0.36 0.10 ... -0.49] | 10 | 16 |
| [0.11 0.38 ... -0.21] | 23 | 127 |
| [-0.78 -0.24 ... 0.19] | 10 | 65 |
| ⋮ | ⋮ | ⋮ |

| Vector | Block | Page |
|---|---|---|
| [0.36 0.10 ... -0.49] | 10 | 16 |
| [0.11 0.38 ... -0.21] | 23 | 127 |
| [-0.78 -0.24 ... 0.19] | 10 | 65 ← 310 |
| [0.06 0.30 ... -0.19] | 10 | 66 ← 320 |
| ⋮ | ⋮ | ⋮ |

| Vector | Block | Page |
|---|---|---|
| [0.36 0.10 ... -0.49] | 10 | 16 |
| [0.11 0.38 ... -0.21] | 23 | 127 |
| [-0.78 -0.24 ... 0.19] | 10 | 65 |
| [0.92 0.10 ... 0.39] | 13 | 0 ← 340 |
| ⋮ | ⋮ | ⋮ |

330 (brace around first three data rows)

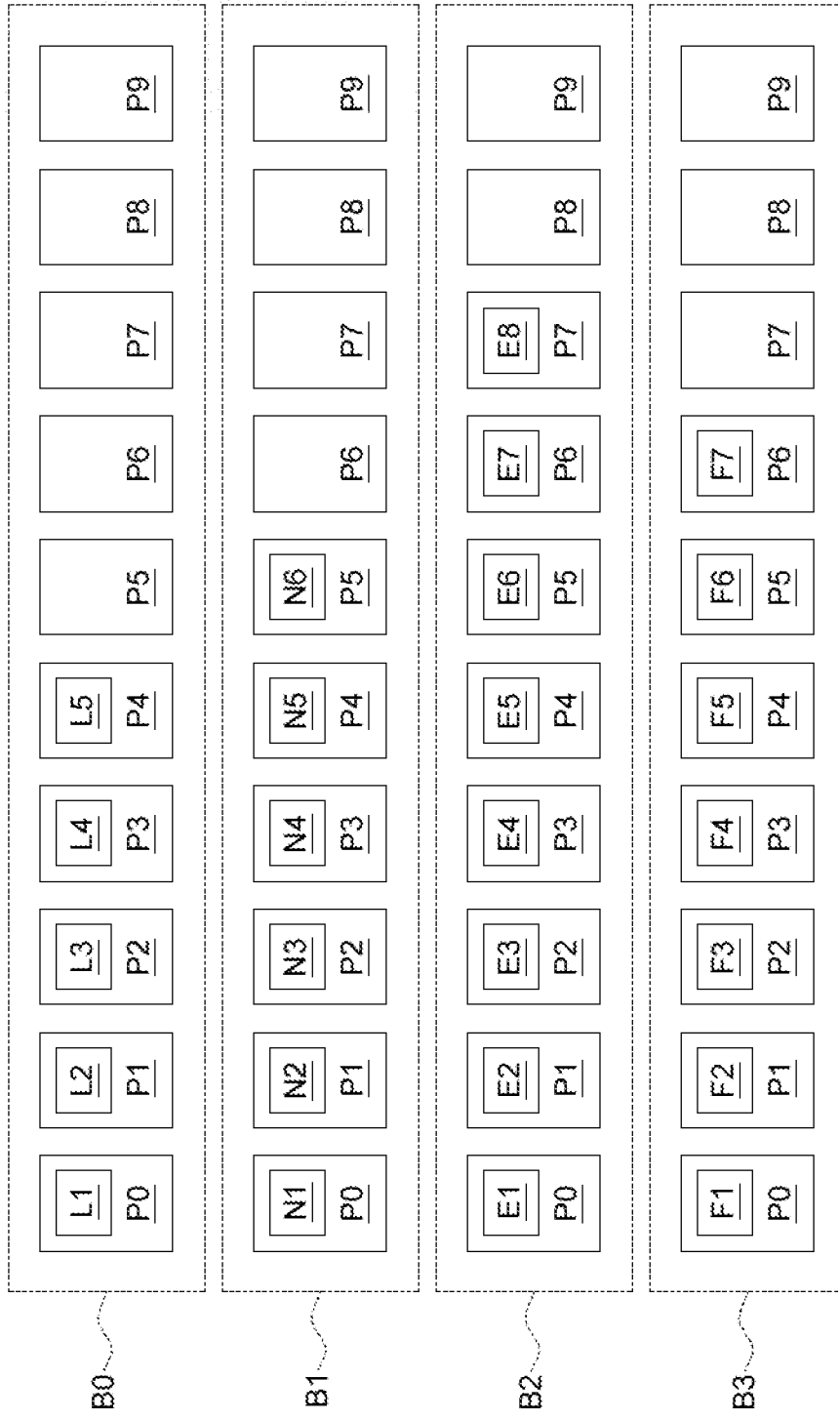
FIG. 4C (One embodiment)

SEMICONDUCTOR MEMORY DEVICE AND DATA STORAGE METHOD THEREOF

TECHNICAL FIELD

The disclosure relates in general to a semiconductor memory device and a data storage method thereof.

BACKGROUND

Semiconductor memory devices are at the core of modern electronic technology, serving a variety of purposes and playing an extremely important role in many fields. Usage of semiconductor memory devices are as follows. (1) Data storage: Solid State Drives (SSD) use semiconductor technology to store data, offering faster speeds, longer lifespans, and greater durability than traditional mechanical hard drives. (2) Temporary memory: DRAM (Dynamic Random Access Memory) and SRAM (Static Random Access Memory) are essential components in computers, mobile phones, and other electronic devices. (3) Cache storage: Semiconductor memory devices are used to store frequently accessed data to speed up access times. (4) Embedded applications: Microcontrollers and chips with specific functions contain embedded memory. (5) Mobile devices: Smartphones, tablets, and other portable devices rely on semiconductor memory devices to store the operating system, applications, and user data.

The significance of semiconductor memory devices includes the following. (1) Speed and performance: Semiconductor memory devices offer fast data access speeds, greatly enhancing the performance of computers and other electronic devices. (2) Durability and reliability: Compared to traditional mechanical storage devices, semiconductor memory devices are more robust and less susceptible to damage from impacts or vibrations. (3) Energy efficiency: Semiconductor memory devices typically consume less power, which helps extend battery life, especially crucial in mobile devices. (4) Compactness: Semiconductor technology allows for the production of small, lightweight memory devices, enabling modern electronic devices to be thinner and lighter. (5) Technological advancement and innovation: The ongoing development of semiconductor memory devices drives technological progress, making new applications, features, and services possible.

In summary, semiconductor memory devices are indispensable in today's electronic world, supporting the operation of various applications and facilitating continuous technological advancement and innovation.

For SSDs, the sequential read and write speeds are faster than random read and write speeds. However, due to the Flash Translation Layer (FTL) in SSDs, most reads and writes are random. This is because the FTL maps the operating system's logical addresses to the SSD's physical addresses, making the actual physical addresses of read and write operations non-sequential.

According to the file management (FM) method, related images are placed in the same folder, such as a pet folder, family folder, travel folder, etc. This file management method helps users easily locate photos of a specific event or theme.

When opening different folders or searching for images through text, the goal is to browse or find related images. Therefore, if similar images can be stored in adjacent physical memory pages within the semiconductor memory device, efficiency can be improved through sequential reading.

Thus, one of the industry's efforts is to achieve as many sequential reads as possible in semiconductor memory devices to enhance reading efficiency and search speed.

SUMMARY

According to one embodiment, provided is a data storage method for a semiconductor memory device including a memory array, the data storage method comprising the following steps: when determining that an input data conforms to a target format, generating an input data vector based on the input data; and when determining that the input data is similar to a stored data in a target block of the memory array, writing the input data to a blank target memory page of the target block of the memory array.

According to another embodiment, provided is a semiconductor memory device including: a control circuit; and a memory array coupled to the control circuit. The control circuit is configured for: when determining that an input data conforms to a target format, generating an input data vector based on the input data; and when determining that the input data is similar to a stored data in a target block of the memory array, writing the input data to a blank target memory page of the target block of the memory array.

BRIEF DESCRIPTION OF THE DRAWINGS

FIGS. 3A to 3C show a writing strategy of an embedding vector table according to one embodiment of the application.

FIGS. 4A to 4C show an input data writing strategy according to one embodiment of the application and prior art.

Figure 1:
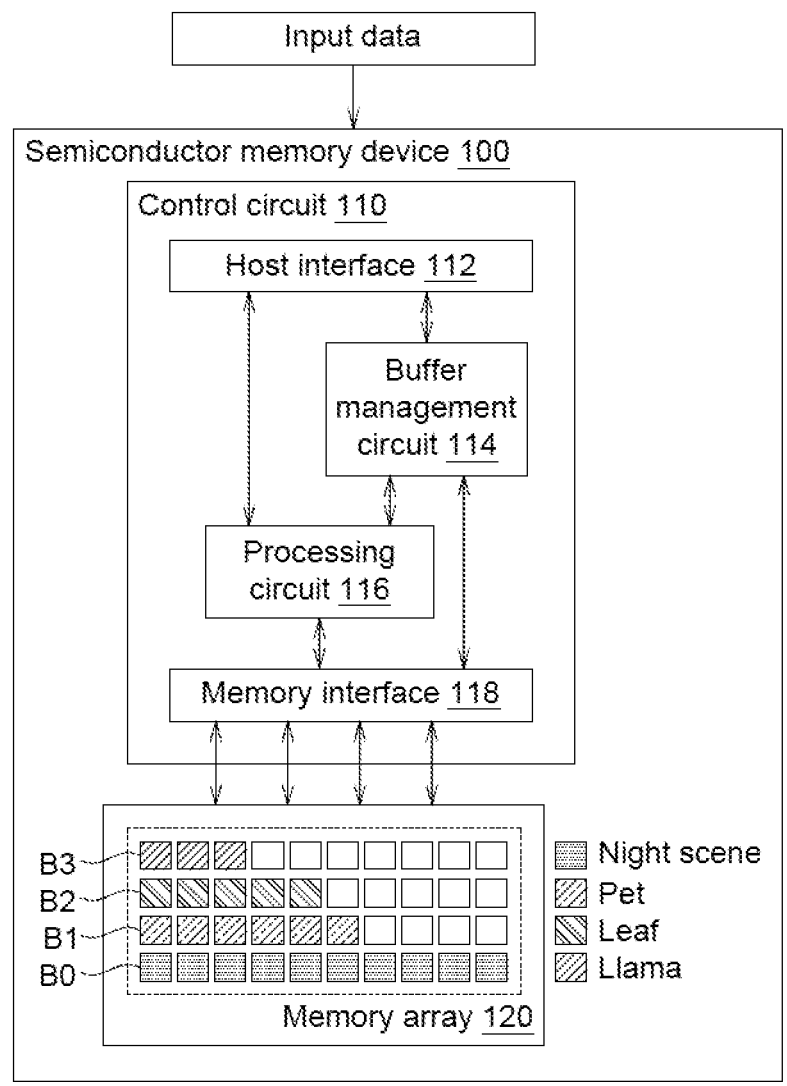
FIG. 1 illustrates a functional block diagram of a semiconductor memory device according to one embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

In one embodiment of the application, images or data with high similarity are stored in adjacent physical memory pages of the semiconductor memory device. Due to user habits and file management, images or data with high similarity in the same folder have a high chance of being read simultaneously. Therefore, data in the semiconductor memory device can be read sequentially rather than randomly, thereby improving reading efficiency.

FIG. 1 illustrates a functional block diagram of a semiconductor memory device according to one embodiment of the application. The semiconductor memory device 100 of one embodiment includes: a control circuit 110 and a memory array 120. The memory array 120 is coupled to the control circuit 110. Of course, the semiconductor memory device 100 can also include other components, which are omitted here. The semiconductor memory device 100 has both sequential read-write modes and random read-write modes, with the sequential read-write speed being higher than the random read-write speed.

The control circuit 110 includes: a host interface 112, a buffer management circuit 114, a processing circuit 116, and a memory interface 118. Of course, the control circuit 110 can also include other components, which are omitted here.

The control circuit 110 receives input data transmitted from the host (not shown) through the host interface 112. Here, the host can be a personal computer, laptop, cloud server, etc. The semiconductor memory device 100 is installed in the host or is coupled to the host through other communication protocols (such as but not limited to USB), all of which are within the spirit of the application.

The buffer management circuit 114 is coupled to the host interface 112, the processing circuit 116, and the memory interface 118. The buffer management circuit 114 can perform buffer management. Details of the buffer management circuit 114 are omitted here.

The processing circuit 116 is coupled to the host interface 112, the buffer management circuit 114, and the memory interface 118. The processing circuit 116 applies a storage strategy to the received input data, so that the received input data is stored in the memory array 120 according to this storage strategy. The storage strategy of the processing circuit 116 will be described below.

The memory interface 118 is coupled to the buffer management circuit 114 and the processing circuit 116. The control circuit 110 is coupled to the memory array 120 through the memory interface 118. The memory array 120 includes a plurality of blocks, and each block contains a plurality of memory pages. For example, through the storage strategy of the processing circuit 116, night scene images are stored in the block B0; pet images are stored in the block B1; leaf images are stored in block the B2; and Llama images are stored in block the B3. That is, highly similar data is stored in continuous physical memory pages of the same block to enhance the possibility of sequential reading.

Figure 2:
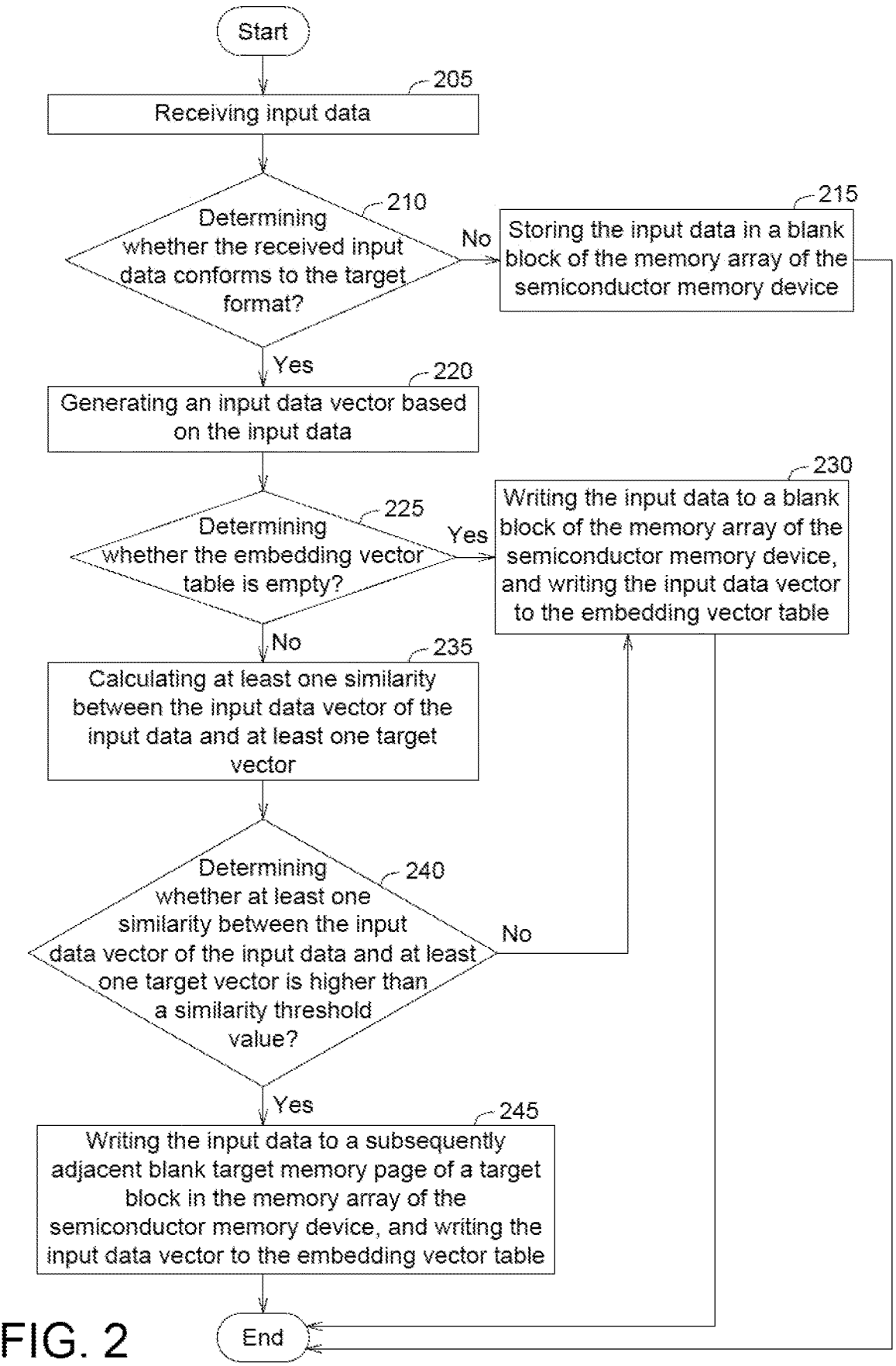
FIG. 2 shows a flowchart of a data storage method for a semiconductor memory device according to one embodiment of the application.

FIG. 2 shows a flowchart of a data storage method for the semiconductor memory device according to one embodiment of the application. That is, FIG. 2 represents the storage strategy of the processing circuit 116.

At step 205, input data is received.

At step 210, whether the received input data conforms to the target format is determined. Here, the target format is exemplified as "image format", but the application is not limited to this. In other possible embodiments of the application, the target format can also be: video format, music format, etc. That is, the target format includes: an image format, a video format, and/or a music format. If step 210 is "no", the process proceeds to step 215. If step 210 is "yes", the process proceeds to step 220.

At step 215 (when the input data does not conform to the target format), the input data is stored in a blank block of the memory array 120 of the semiconductor memory device 100.

At step 220 (when the input data conforms to the target format), an input data vector is generated based on the input data using an embedding model. For example, but not limited to, the input data vector is a one-dimensional vector. Of course, the application is not limited to this. In other possible embodiments of the application, the input data vector is a multi-dimensional vector. This is also within the spirit of the application.

At step 225, it is determined whether the embedding vector table is empty. If step 225 is "no", the process proceeds to step 235. If step 225 is "yes", the process proceeds to step 230.

At step 230 (when the embedding vector table is empty), the input data is written to a blank block of the memory array 120 of the semiconductor memory device 100, and the input data vector is written to the embedding vector table. That is, in one embodiment of the application, when the input data is written to a blank block of the memory array 120 of the semiconductor memory device 100, the input data vector of the input data is also written to the embedding vector table. Therefore, in one embodiment of the application, the input data vector of the input data stored in the memory array 120 will be written to the embedding vector table.

At step 235 (when the embedding vector table is not empty), at least one similarity between the input data vector of the input data and at least one target vector is calculated. Here, the "target vector" refers to the vector of the data stored in the last non-empty memory page of each non-empty block in the memory array 120. Similarity can be, for example but not limited to: Euclidean distance, Manhattan distance, Minkowski distance, Chebyshev distance, Cosine Similarity, etc. That is, in step 235, the input data is compared to the data stored in the last non-empty memory page of each non-empty block in the memory array 120.

At step 240, it is determined whether at least one similarity between the input data vector of the input data and at least one target vector is higher than a similarity threshold value. Here, the similarity threshold value is exemplified as 0.75, for instance. The value of the similarity threshold can be set based on the accuracy of the embedding model. If step 240 is "yes" (indicating that the input data is highly similar to one of the data currently stored in the memory array 120), the process proceeds to step 245. That is, in step 240, it is determined whether the input data is highly similar to the stored data in the last non-empty memory page of all non-empty blocks in the memory array 120.

If step 240 is "no" (indicating that the input data is not highly similar to all the data currently stored in the memory array 120), the process proceeds to step 230.

In step 245, the input data is written to a subsequently adjacent blank target memory page of a target block in the memory array 120 of the semiconductor memory device 100, and the input data vector is written to the embedding vector table. Here, the target block refers to a block in the memory array 120 where the data stored in the last non-empty memory page of the target block is highly similar to the input data. Therefore, the input data is written to the subsequently adjacent blank target memory page within the target block. That is, in one embodiment of the application, highly similar data is stored in adjacent physical storage locations. In this way, when searching/reading, there is a chance to continuously read these highly similar data, thereby improving reading efficiency.

To clarify the storage strategy of one embodiment of the application, please refer to FIGS. 3A to 3C, which show the writing strategy of the embedding vector table according to one embodiment of the application. The embedding vector table 300 is located within the processing circuit 116. The embedding vector table 300 includes multiple fields. Here, three fields are exemplified, but the application is not limited to this. The embedding vector table 300 includes: a vector field, a block field, and a memory page field. The vector field is used to store vectors, the block field indicates which block the data related to that vector is stored in, and the memory page field indicates which memory page the data related to that vector is stored in.

As shown in FIG. 3A, the embedding vector table 300 currently has three vectors.

As shown in FIG. 3B, the input vector [0.06 0.30 . . . 0.19] is compared to the second vector [0.11 0.38 . . . 0.21] and the third vector [−0.78 −0.24 . . . 0.19]. The second vector is a vector of data stored in a last non-empty memory page (127) of the block 23. The third vector is a vector of data stored in a last non-empty memory page (65) of the block 10. In step 310, it is determined that the input vector is highly similar to the third vector. Therefore, in step 320, the input vector is written to the fourth position of the vector field, and the input data related to the input vector is written to an adjacent blank memory page (66) in block 10. In FIG. 3B, the input vector is compared with the vector of data stored in the last non-empty memory page of the non-empty block. However, in other possible embodiment of the application, the input vector is compared with the vector of data stored in any non-empty memory page of the non-empty block, which is still within the spirit and the scope of the application.

As shown in FIG. 3C, the input vector is compared to the second and third vectors. In step 330, it is determined that the input vector is similar to none of the second and third vectors. Therefore, in step 340, the input vector is written to the fourth position of the vector field, and the input data related to the input vector is written to a first blank memory page (0) of a blank block (13).

Figure 4A:
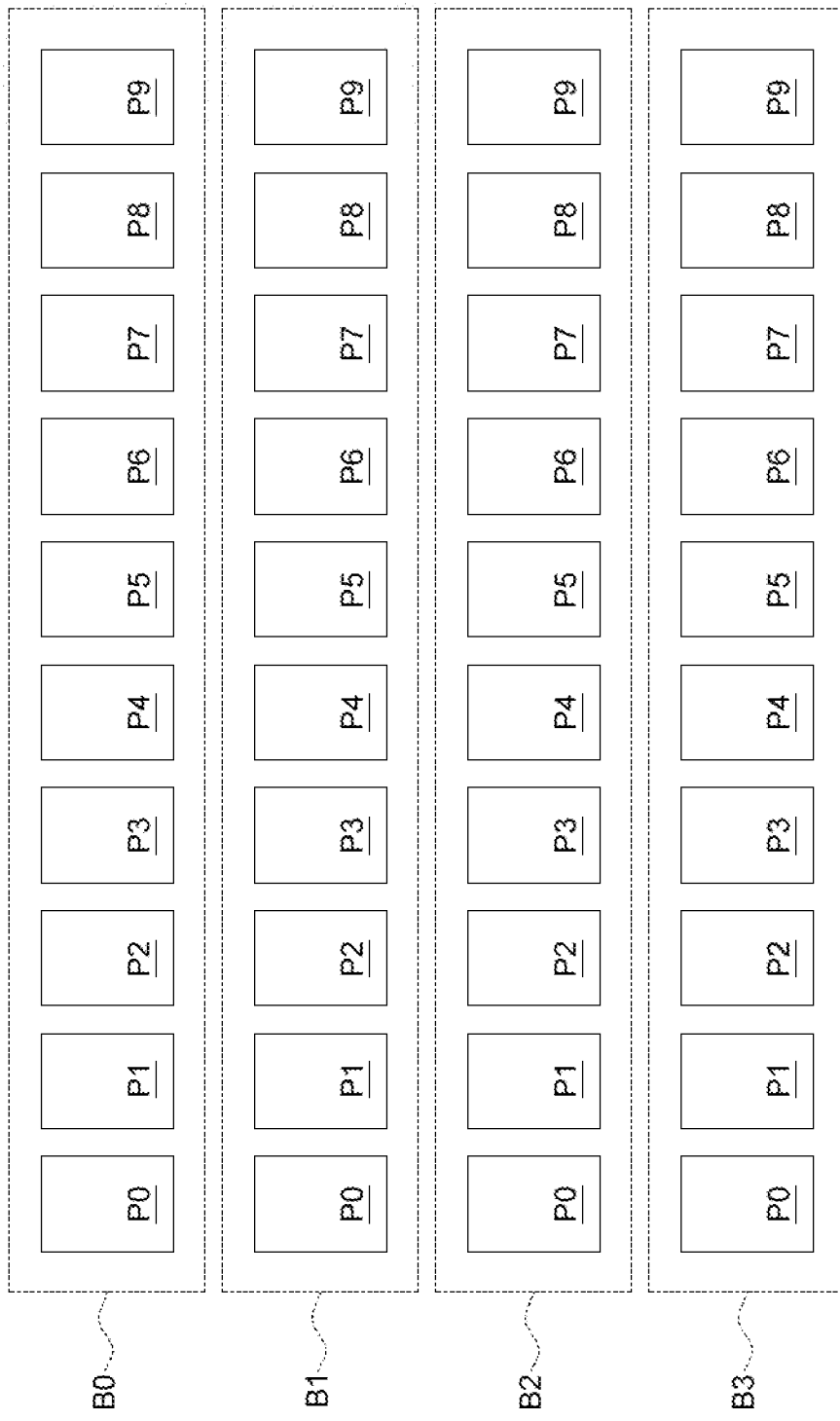
Figure 4B:
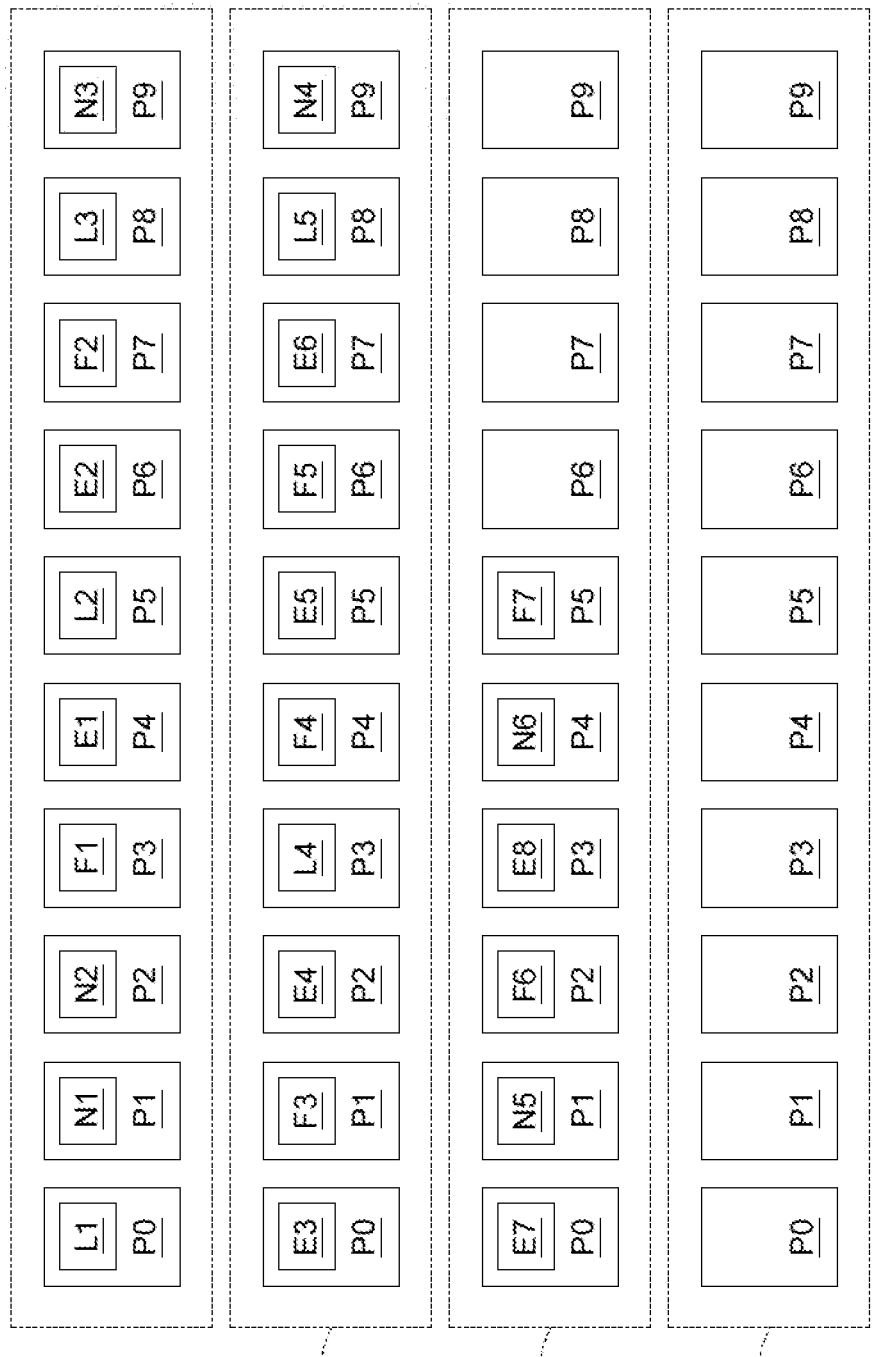

To clarify the storage strategy of one embodiment of the application, please refer to FIGS. 4A to 4C, which show the input data writing strategy according to one embodiment of the application and prior art. In FIG. 4A, the memory array 120 includes multiple blocks, each of which includes multiple memory pages. For example, the memory array 120 includes blocks B0-B3, and each of these blocks B0-B3 includes memory pages P0-P9. But the application is not limited to this.

FIG. 4B shows the input data writing strategy of the prior art.

FIG. 4C shows the input data writing strategy according to one embodiment of the application. In FIGS. 4B and 4C, L1-L5 represent five Llama images, N1-N6 represent six night scene images, E1-E8 represent eight pet images, and F1-F7 represent seven leaf images. Of course, this is just for illustrative purposes.

As shown in FIG. 4B, in the prior art, the Llama images L1-L5, night scene images N1-N6, pet images E1-E8, and leaf images F1-F7 are written to the memory array 120 in a random write mode.

As shown in FIG. 4C, in one embodiment of the application, the images are written to the memory array 120 based on their similarities. For example, the Llama images L1-L5 are written to memory pages P0-P4 in block B0; the night scene images N1-N6 are written to memory pages P0-P5 in block B1; the pet images E1-E8 are written to memory pages P0-P7 in block B2; and the leaf images F1-F7 are written to memory pages P0-P6 in block B3.

In the storage strategy of the prior art, even if the input data has a high similarity, highly similar data are still randomly written to different memory pages (as shown in FIG. 4B). In this way, when users search for these highly similar input data, these input data are randomly read. Since the speed of random reading is slower than continuous reading, the reading efficiency of FIG. 4B is worse.

Conversely, through the storage strategy of this embodiment, input data with high similarity can be written to adjacent physical memory pages within the same block (as shown in FIG. 4C). In this way, when users search for these highly similar input data, these input data can read consecutively. Since the speed of continuous reading (or said sequential reading) is higher than that of random reading, the reading efficiency of FIG. 4C is better and higher than that of FIG. 4B.

Taking the memory page of the memory array 120 as 4 KB, the continuous reading speed as 7000 MB/s, and the random reading speed as 1000K IOPS (input/output operations per second) as examples, but it is understood that the application is not limited to this. Accordingly, the time required to read a single memory page in continuous reading mode is: 4 KB/7000 MB=5.71*107 (s), and the time required to read a single memory page in random reading mode is: 1/1000K=1*10-6 (s).

In FIG. 4B, taking the reading of 6 night scene images N1-N6 as an example. Night scene images N1 and N2 are stored in adjacent memory pages and night scene images N3-N6 are stored in non-adjacent memory pages. When reading night scene images N1-N6, there will be 1 continuous read and 5 random reads. Therefore, the total reading time is: $5*1*10^{-6}$ (s)+$1*5.71*10^{-7}$ (s)=$5.571*10^{-6}$ (s).

Conversely, in FIG. 4C, taking the reading of 6 night scene images N1-N6 as an example. Since night scene images N1-N6 are stored in adjacent memory pages, when reading night scene images N1-N6, there will be 1 random read and 5 continuous reads. Therefore, the total reading time is: $1*1*10^{-6}$ (s)+$5*5.71*10^{-7}$ (s)=$3.855*10^{-6}$ (s).

The reading time of the embodiment in FIG. 4C is 69% (=$3.855*10^{-6}$/$5.571*10^{-6}$) of the reading time of the prior art in FIG. 4B. That is, it can save about 31% of the reading time.

Assuming a block has N (N is a positive integer) memory pages. If viewed in the worst case, in the prior art, N images are all random reads, but in this embodiment, N images are all continuous reads. The reading time saved by this embodiment is shown in formula (1):

$$\left(1 - \frac{\text{with strategy}}{\text{without strategy}}\right)*100\% = \qquad (1)$$

$$1 - \frac{\text{random read time} + (N-1)*\text{sequential read time}}{N*\text{Random read time}} =$$

$$1 - \frac{1*10^{-6} + (N-1)*5.71*10^{-7}}{N*1*10^{-6}} = 1 - \left(\frac{4.29*10^{-1}}{N} + 5.71*10^{-1}\right)$$

In formula (1), "with strategy" and "without strategy" respectively represent the reading time of this embodiment and the prior art; "random read time" and "sequential read time" respectively represent random reading time and sequential reading time.

From formula (1), it can be seen that this embodiment can effectively reduce the reading time.

Figure 5A:
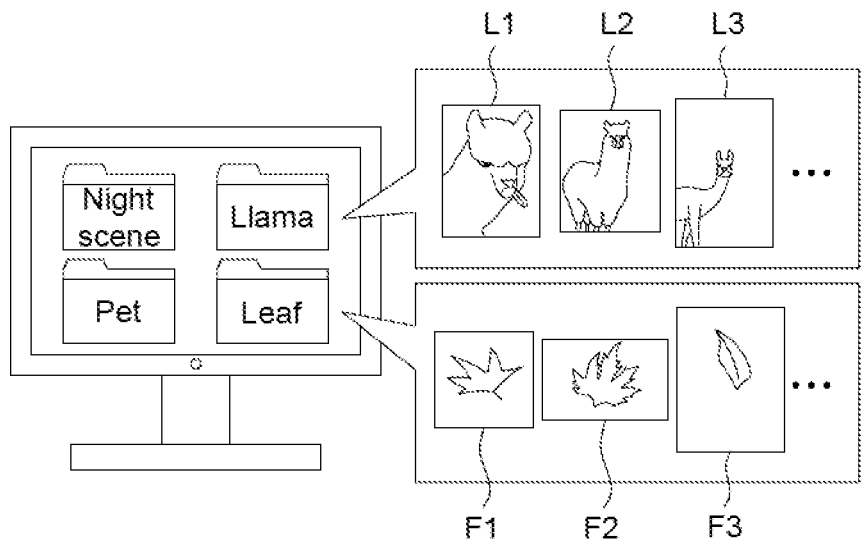
FIG. 5A shows the application of this embodiment to file management on a personal computer.
Figure 5B:
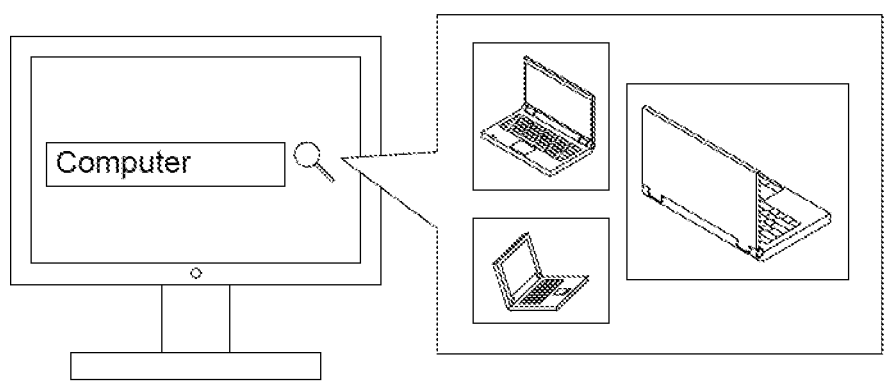
FIG. 5B shows the application of this embodiment to the "search image by text" on a cloud server.

FIG. 5A shows the application of this embodiment to file management on a personal computer, and FIG. 5B shows the application of this embodiment to the "search image by text" on a cloud server.

This embodiment can be used in an image data center. By replacing different embedding models, it can also be used in streaming media services and music platforms (such as, but not limited to, Netflix, YouTube, Apple Music, etc.). For example, when this embodiment is applied to streaming services, movies of the same type (such as action movies) can be stored in adjacent physical storage locations (i.e. adjacent memory pages of the same block of the semiconductor memory device), or movies of the same series (such as Harry Potter movies from the first to the sixth) can be stored in adjacent physical storage locations. Therefore, this embodiment has high flexibility, allows the replacement or adjustment of the embedding model to adapt to different applications, and can improve data reading efficiency.

A file-specific server, by storing similar data or data from the same author in adjacent memory pages, can also improve data search efficiency.

According to the NVME 2.0 specification published by the Non-Volatile Memory Express (NVME) organization, this embodiment can be easily implemented in the host computer.

As mentioned above, in this embodiment, storing highly similar data in adjacent physical storage locations of the semiconductor device's memory array can improve the speed of searching or browsing data. The optimized data storage strategy of this embodiment can reduce the probability of random reading because similar data may be read together at similar times or in similar situations.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A data storage method for a semiconductor memory device including a memory array, the data storage method comprising the following steps:
   when determining that an input data conforms to a target format, generating an input data vector based on the input data; and
   when determining that the input data is similar to a stored data in a target block of the memory array, writing the input data to a blank target memory page of the target block of the memory array.

2. The data storage method for the semiconductor memory device of claim 1, wherein the target format includes: an image format, a video format, and/or a music format.

3. The data storage method for the semiconductor memory device of claim 1, wherein when determining that the input data does not conform to the target format, the input data is stored in a blank block of the memory array of the semiconductor memory device.

4. The data storage method for the semiconductor memory device of claim 1, further comprising: determining whether an embedding vector table is blank.

5. The data storage method for the semiconductor memory device of claim 4, wherein when determining that the embedding vector table is blank, the input data is written to a blank block of the memory array, and the input data vector is written to the embedding vector table.

6. The data storage method for the semiconductor memory device of claim 4, wherein the step of determining that the input data is similar to the stored data in the target block of the memory array includes:
   when determining that the embedding vector table is not blank, calculating a similarity between the input data vector of the input data and a target vector to determine whether the input data is similar to the stored data of the target block of the memory array, wherein the target vector is related to a stored data of a non-blank memory page in the target block of the memory array.

7. The data storage method for the semiconductor memory device of claim 6, wherein the target vector is a vector of a stored data of a last non-blank memory page of the target block of the memory array.

8. The data storage method for the semiconductor memory device of claim 6, wherein
   when the similarity between the input data vector of the input data and the target vector is higher than a similarity threshold value, the input data is determined to be similar to the stored data of the target block of the memory array; and
   when the similarity between the input data vector of the input data and the target vector is lower than the similarity threshold value, the input data is determined to be not similar to the stored data of the target block of the memory array.

9. The data storage method for the semiconductor memory device of claim 6, wherein when the input data is determined to be not similar to the stored data of the target block of the memory array, the input data is written to a blank block of the memory array, and the input data vector is written to the embedding vector table.

10. The data storage method for the semiconductor memory device of claim 6, wherein when the input data is determined to be similar to the stored data of the target block of the memory array, the input data is written to a subsequently adjacent blank target page of the target block of the memory array, and the input data vector is written to the embedding vector table.

11. A semiconductor memory device including:
    a control circuit; and
    a memory array coupled to the control circuit,
    wherein the control circuit is configured for:
       when determining that an input data conforms to a target format,
       generating an input data vector based on the input data; and when determining that the input data is similar to a stored data in a target block of the memory array, writing the input data to a blank target memory page of the target block of the memory array.

12. The semiconductor memory device of claim 11, wherein the target format includes: an image format, a video format, and/or a music format.

13. The semiconductor memory device of claim 11, wherein the control circuit is configured for:
when determining that the input data does not conform to the target format, storing the input data in a blank block of the memory array of the semiconductor memory device.

14. The semiconductor memory device of claim 11, wherein the control circuit is configured for:
determining whether an embedding vector table is blank.

15. The semiconductor memory device of claim 14, wherein the control circuit is configured for:
when determining that the embedding vector table is blank, writing the input data to a blank block of the memory array, and writing the input data vector to the embedding vector table.

16. The semiconductor memory device of claim 14, wherein in determining that the input data is similar to the stored data in the target block of the memory array, the control circuit is configured for:
when determining that the embedding vector table is not blank, calculating a similarity between the input data vector of the input data and a target vector to determine whether the input data is similar to the stored data of the target block of the memory array, wherein the target vector is related to a stored data of a non-blank memory page in the target block of the memory array.

17. The semiconductor memory device of claim 16, wherein the target vector is a vector of a stored data of a last non-blank memory page of the target block of the memory array.

18. The semiconductor memory device of claim 16, wherein the control circuit is configured for:
when the similarity between the input data vector of the input data and the target vector is higher than a similarity threshold value, determining that the input data is similar to the stored data of the target block of the memory array; and
when the similarity between the input data vector of the input data and the target vector is lower than the similarity threshold value, determining that the input data is not similar to the stored data of the target block of the memory array.

19. The semiconductor memory device of claim 16, wherein the control circuit is configured for:
when the input data is determined to be not similar to the stored data of the target block of the memory array, writing the input data to a blank block of the memory array, and writing the input data vector to the embedding vector table.

20. The semiconductor memory device of claim 16, wherein the control circuit is configured for:
when the input data is determined to be similar to the stored data of the target block of the memory array, writing the input data to a subsequently adjacent blank target page of the target block of the memory array, and writing the input data vector to the embedding vector table.

* * * * *